United States Patent
Veenstra et al.

(10) Patent No.: US 12,255,385 B2
(45) Date of Patent: Mar. 18, 2025

(54) RADAR TRANSPARENT CONSTRUCTION FOR ILLUMINATED SYMBOLS

(71) Applicant: Innotec, Corp., Zeeland, MI (US)

(72) Inventors: Thomas J. Veenstra, Lakewood, CO (US); Michael G. Elenbaas, Hudsonville, MI (US)

(73) Assignee: Innotec, Corp., Zeeland, MI (US)

( * ) Notice: Subject to any disclaimer, the term of this patent is extended or adjusted under 35 U.S.C. 154(b) by 247 days.

(21) Appl. No.: 18/070,008

(22) Filed: Nov. 28, 2022

(65) Prior Publication Data

US 2024/0175976 A1    May 30, 2024

(51) Int. Cl.
*H01Q 1/32* (2006.01)
*G01S 7/02* (2006.01)
*G01S 13/931* (2020.01)
*H01Q 1/06* (2006.01)
*H01Q 1/42* (2006.01)

(52) U.S. Cl.
CPC ........... *H01Q 1/3233* (2013.01); *G01S 7/027* (2021.05); *H01Q 1/06* (2013.01); *H01Q 1/3283* (2013.01); *H01Q 1/42* (2013.01); *H01Q 1/422* (2013.01); *G01S 13/931* (2013.01)

(58) Field of Classification Search
CPC ...... H01Q 1/06; H01Q 1/3233; H01Q 1/3283; H01Q 1/42; H01Q 1/422; G01S 7/027; G01S 19/931
See application file for complete search history.

(56) References Cited

U.S. PATENT DOCUMENTS

| | | | |
|---|---|---|---|
| 8,113,695 B2 | 2/2012 | Meinke et al. |
| 2006/0181472 A1 | 8/2006 | Baird et al. |
| 2017/0036594 A1 | 2/2017 | Roberts et al. |
| 2017/0324157 A1 | 11/2017 | Shurish et al. |
| 2020/0335864 A1 | 10/2020 | Shurish et al. |
| 2021/0384622 A1 | 12/2021 | Caruso et al. |
| 2022/0009409 A1 | 1/2022 | Paul et al. |

FOREIGN PATENT DOCUMENTS

| | | |
|---|---|---|
| DE | 102006013931 B4 | 9/2007 |
| DE | 202018104498 U1 | 12/2019 |
| DE | 102018129989 A1 | 5/2020 |
| DE | 102019007425 A1 | 8/2020 |
| GB | 2552996 A | 2/2018 |

OTHER PUBLICATIONS

PCT Search Report and Written Opinion from App. No. PCT/US2023/34796, dated Jan. 2, 2024.

*Primary Examiner* — Robert Karacsony
(74) *Attorney, Agent, or Firm* — Warner Norcross + Judd LLP (57) ABSTRACT

A multi-layer radome with an illuminated symbol. The multi-layer radome can include an overmolded applique, a light assembly, and a waveguide. The waveguide can be located between the light assembly and the overmolded applique. The waveguide can be configured to transmit light from the light assembly to the overmolded applique. The light from the light assembly can light up the overmolded applique resulting in an illuminated symbol. The multi-layer radome can utilize a two-layer construction.

18 Claims, 7 Drawing Sheets

RADAR TRANSPARENT CONSTRUCTION FOR ILLUMINATED SYMBOLS

BACKGROUND OF THE INVENTION

The present invention relates to (a) reducing the radar-interfering components in a multi-layer radome having an illuminated symbol and (b) improving the radar transparency of the multi-layer radome.

Radar transceivers are commonly used on the front of automotive vehicles for safety and other features. Specifically, 77 GHz radar (millimeter wave) transceivers are frequently used. The optimum position for the transceiver is the front middle of the grille of the automotive vehicle. These transceivers are bulky and unattractive, so it is common and preferred to hide them behind a radar transparent emblem in the grill. In recent years, illuminated grill emblems or symbols have become popular. Thus, there is a need for grill emblems that are both radar transparent and illuminated.

Constructions that combine radar transparency and illuminated symbols are limited by performance and cost. Illuminated emblems require additional layers of materials compared to non-illuminated emblems. Radar transparency is diminished by each additional layer in the multi-layer radome. Current illuminated symbol assemblies include three layers: an overmolded applique, a waveguide, and a housing. All three layers are between a radar source and the outside air.

SUMMARY OF THE INVENTION

In one aspect, a multi-layer radome is provided. The multi-layer radome can include an overmolded applique, a light assembly, and a waveguide. The waveguide can be located between the light assembly and the overmolded applique. The waveguide can be configured to transmit light from the light assembly to the overmolded applique.

In one aspect, a multi-layer radome is provided. The multi-layer radome can include an overmolded applique, a light assembly, and a waveguide. The waveguide can be located between the light assembly and the overmolded applique. The waveguide can be configured to transmit light from the light assembly to the overmolded applique. A gasket can be located between the waveguide and the light assembly. The gasket can be configured to seal the connection between the waveguide and the light assembly. A trim bezel can be configured to fixedly couple the overmolded applique, the waveguide, and the light assembly together. A vent patch configured to remove thermal energy from the multi-layer radome can be coupled to the light assembly. The multi-layer radome can include a mating connector configured to secure the multi-layer radome to a radar source.

In one aspect, a multi-layer radome is provided. The multi-layer radome can include an overmolded applique, a light assembly, and a waveguide. The waveguide can be located between the light assembly and the overmolded applique. The waveguide can be directly exposed to an interior of the multi-layer radome. The waveguide can be configured to transmit light from the light assembly to the overmolded applique. The overmolded applique can directly overlap the waveguide.

These and other objects, advantages and features of the invention will be more fully understood and appreciated by reference to the description of the current aspects and the drawings.

Before the aspects of the invention are explained in detail, it is to be understood that the invention is not limited to the details of operation or to the details of construction and the arrangement of the components set forth in the following description or illustrated in the drawings. The invention may be implemented in various other aspects and may be practiced or may be carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various aspects. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT ASPECT

The term "symbol" is used throughout the disclosure to refer to a mark or character used as a conventional representation of an object, function, or process. The term "symbol" encompasses at least emblems, logos, trademarks, and designs.

The term "layer" is used throughout the disclosure to refer to any material that is thick enough to be a noticeable attenuator to millimeter wave radar signals.

Figure 1:
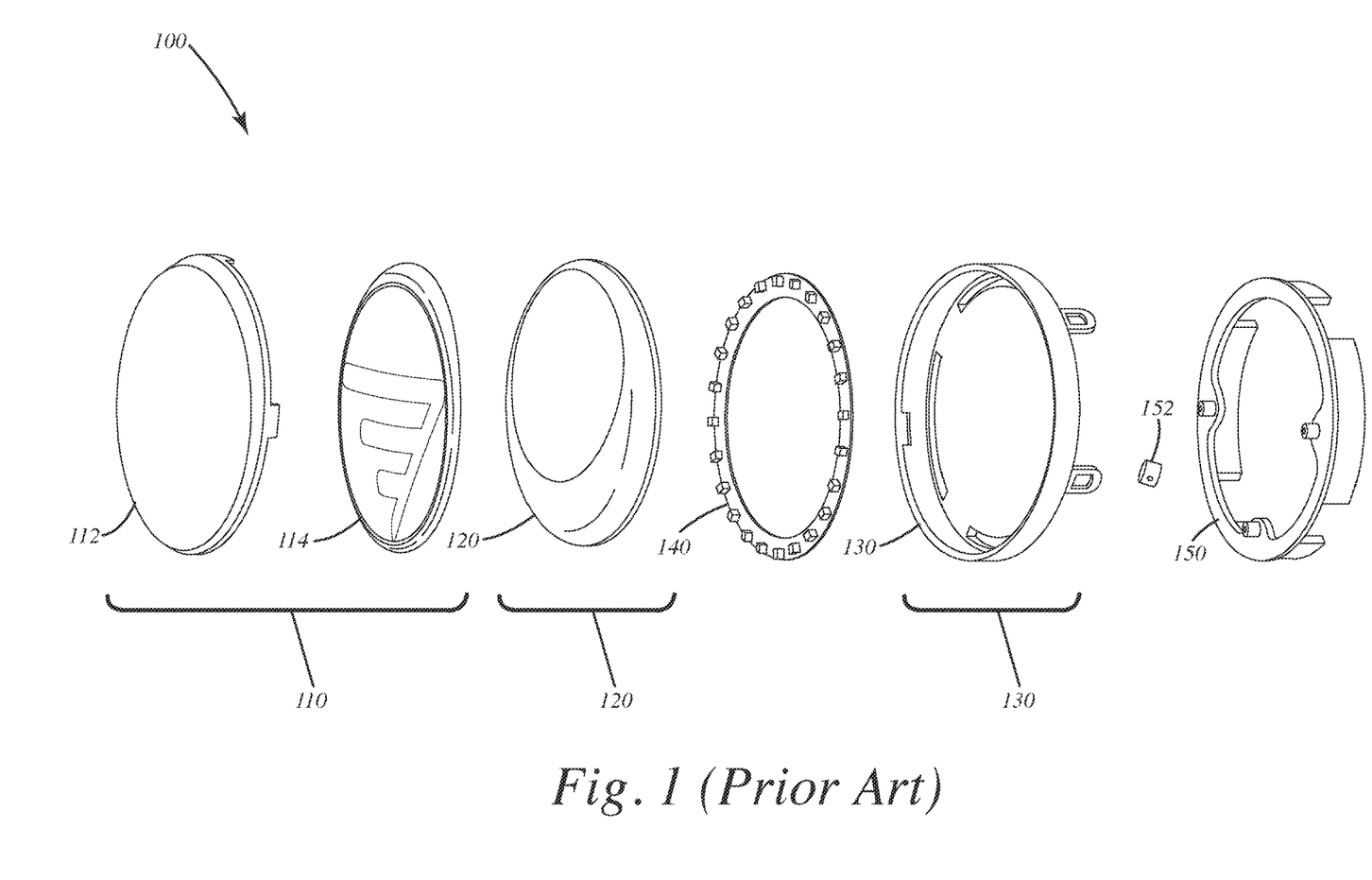
FIG. 1 is an exploded perspective view of a prior art multi-layer radome with an illuminated symbol.
Figure 2:
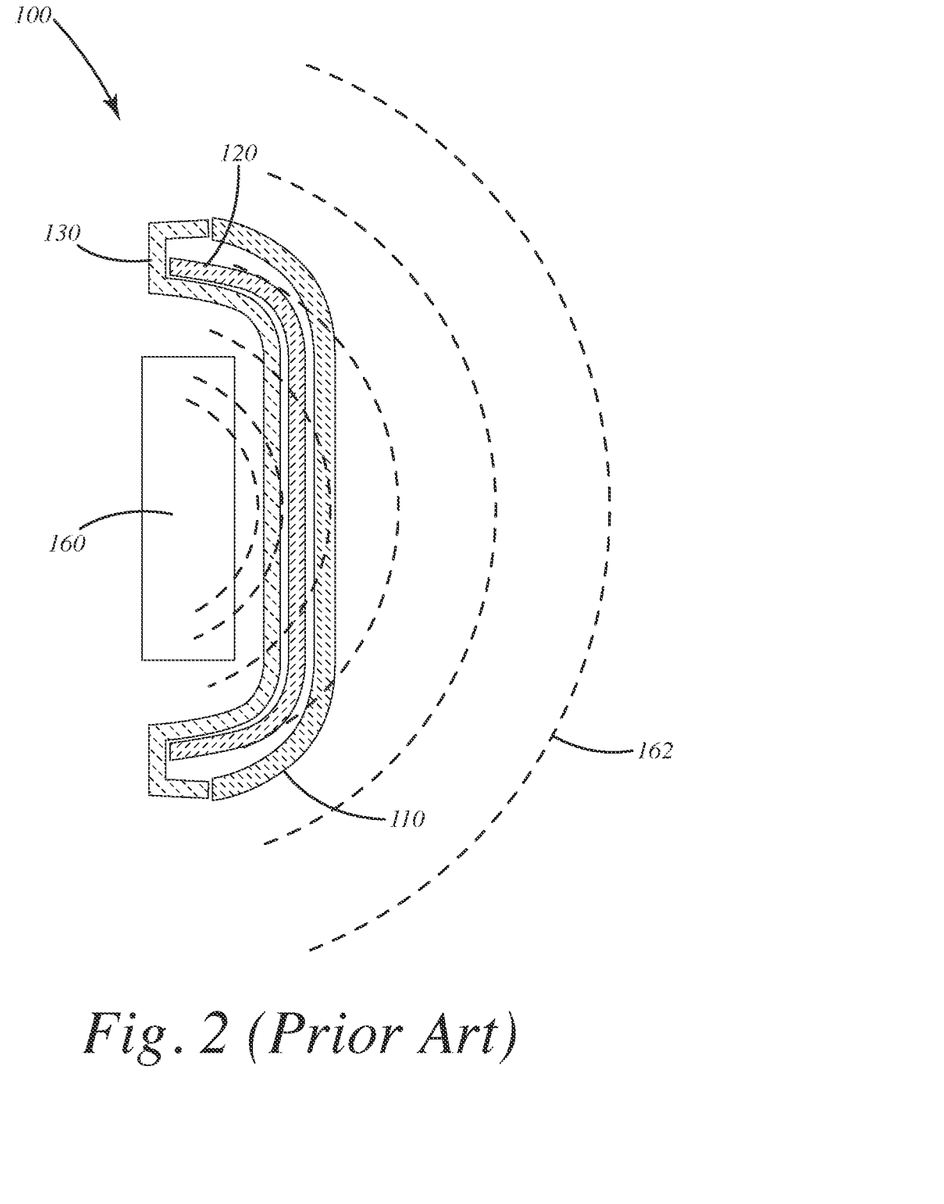
FIG. 2 is a representational view of an overmolded applique, waveguide, and housing of the prior art multi-layer radome with an illuminated symbol of FIG. 1.

FIGS. 1-2 show prior art constructions of a multi-layer radome with an illuminated symbol. In FIG. 1, a prior art multi-layer radome with an illuminated symbol 100 is shown. The multi-layer radome 100 shown in FIG. 1 is an example of a three-layer construction because there are three layers 110, 120, 130 between a radar source 160 and the outer edge of the multi-layer radome 100. The radar source 160 (shown in FIG. 2) can be a radar transceiver, a radar emitter, or a radar receiver. The outer layer 110 can alternately be referred to as an overmolded applique, applique, graphic, symbol, or lens. As depicted, the overmolded applique 110 includes two components: an overmolded portion 112 and a printed graphic film portion 114. In another aspect, the overmolded applique 110 can be formed of a single component, or more than two components. Processes to create the overmolded applique 110 can include injection overmolding, painting, printing, laser etching, and vacuum deposition.

The middle layer 120 may alternately be referred to as a waveguide or light pipe. The waveguide 120 conveys light from a light assembly 140 to the overmolded applique 110 and then redistributes the light in a desired pattern. The light assembly 140 can include a printed circuit board ("PCB") and one or more light elements, for example light emitting diodes ("LEDs"). As depicted, the light assembly 140 is ring-shaped, which allows the light assembly 140 to not interfere with the radar waves sent from the radar source. Also, a ring-shaped light assembly 140 prevents the light assembly 140 from becoming an additional layer in the multi-layer radome 100. In one aspect, the light assembly 140 can include a heat sink or heat fins to assist in removing thermal energy from the light elements.

The inner layer 130 can alternately be referred to as a housing or substrate. The overmolded applique 110, the waveguide 120, and the light assembly 140 can be secured to the housing 130. In some aspects, the housing 130 can attach directly to the vehicle over the radar source 160. In other aspects, the housing 130 can attach to the vehicle through one or more intermediate couplers. As depicted, the multi-layer radome 100 includes a heat sink 150 coupled to the housing 130. In one aspect, the heat sink 150 can be made from cast aluminum. The heat sink 150 carries thermal energy away from the housing 130. As depicted, the heat sink 150 is ring-shaped to avoid interfering with the radar source 160. As depicted, the multi-layer radome 100 includes a vent 152 coupled to the housing 130 that carries thermal energy away from the housing 130.

Radar transparency is set by the material properties and the thickness of the layer or layers. In cases where there are multiple layers, the overall radar transparency is determined by the combination of these materials and layer thicknesses. To achieve high radar transparency, the selected material should have a low absorption loss. The absorption loss is also commonly called the dissipation constant or the complex permittivity. The optimal value for the real portion of the permittivity, however, depends on the thickness of the material. Conversely, the optimal thickness of the material depends on the permittivity of the material. The optimal condition occurs when the primary reflected wave is canceled out by the secondary wave.

Figure 5:
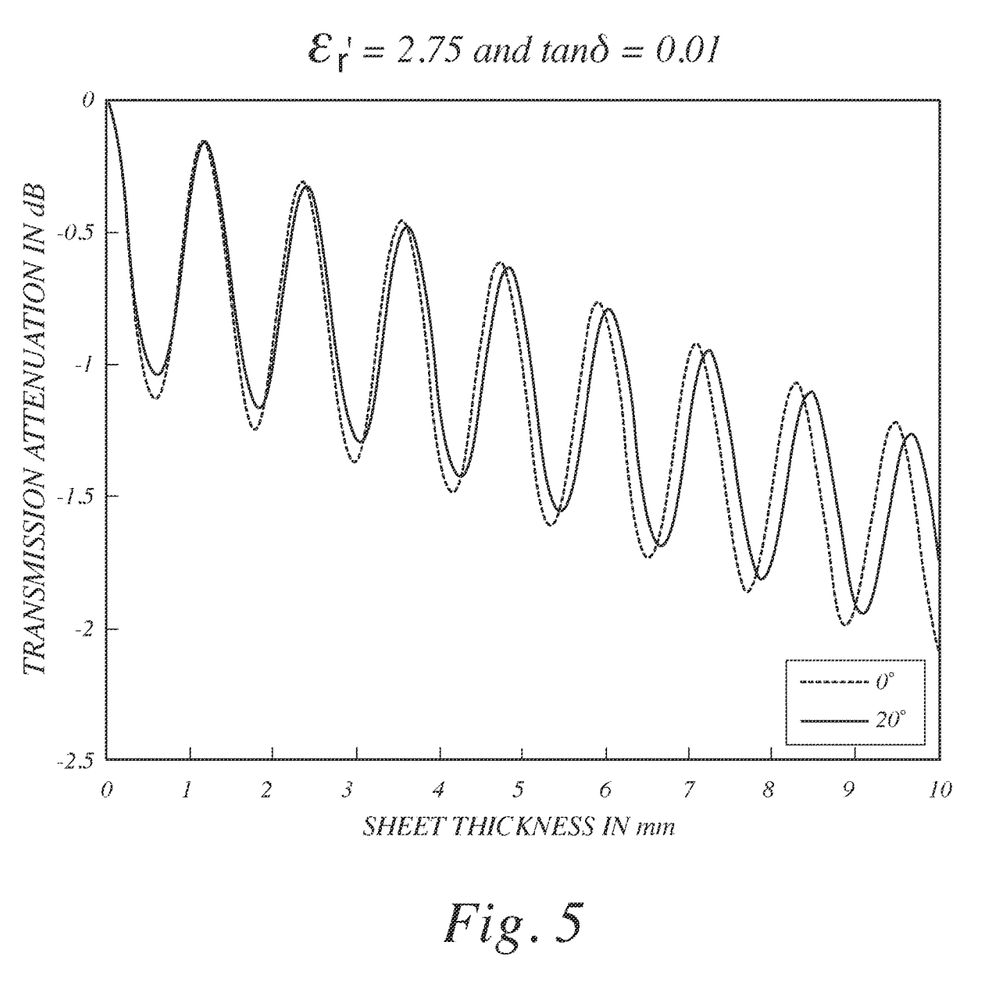
FIG. 5 is a graph of radar transparency versus material thickness.

As shown in FIG. 5, as the thickness of the layer is increased, it cycles in and out of high to low transparency while the maximum possible transparency becomes less with increasing thickness. Achieving radar transparency becomes exceedingly complicated when air gaps and additional layers are introduced into the system. A solution with minimal thickness, small air gaps, and minimal layers aids in achieving radar transparency when compared to thicker materials, more layers, and more air gaps.

FIG. 2 is a representational view of the multi-layer radome 100 of FIG. 1 showing the three-layer construction. The radar source 160 is shown emitting radar waves 162. The radar waves 162 travel through the housing 130, the waveguide 120, and the overmolded applique 110.

Figure 3:
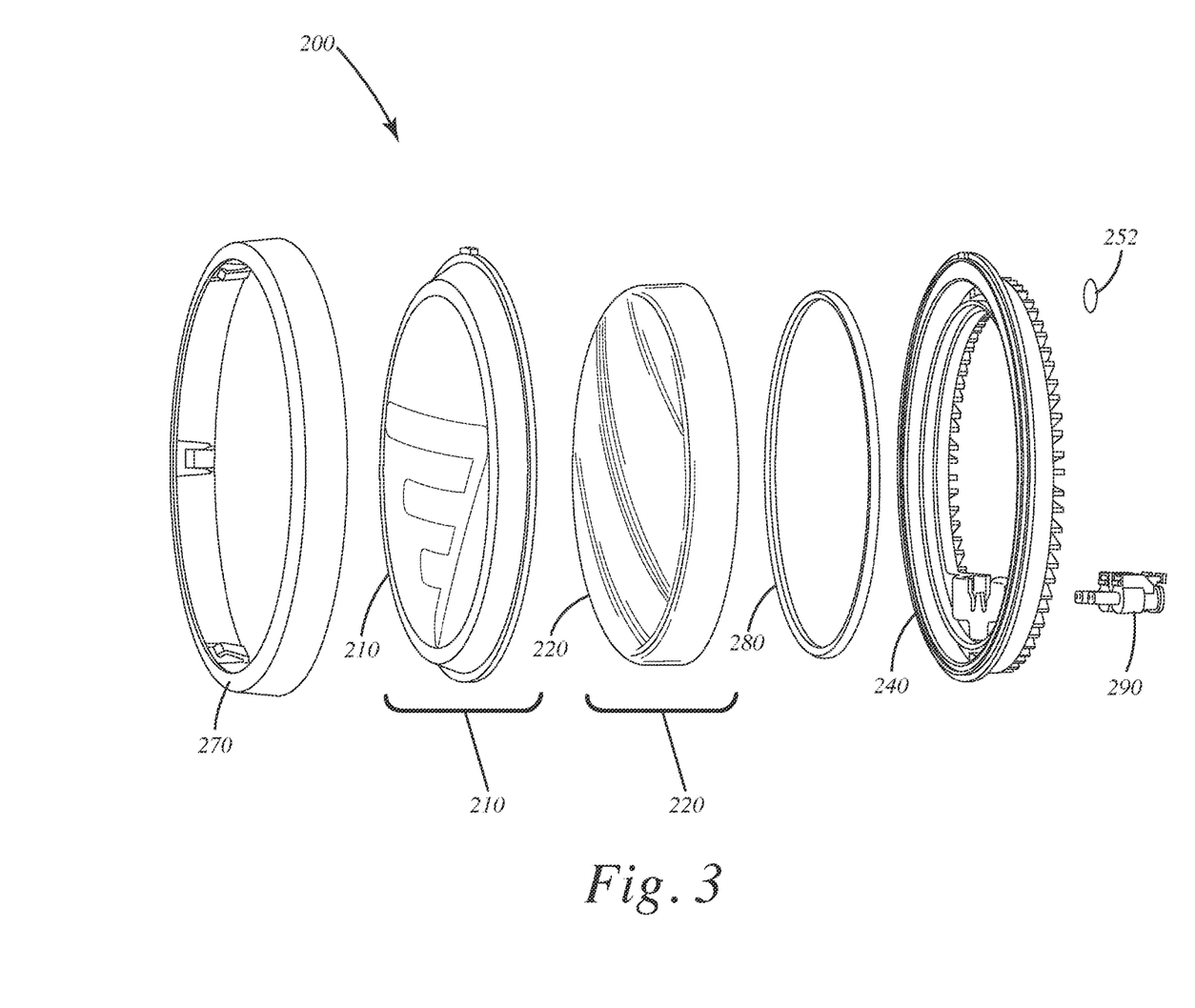
FIG. 3 is an exploded perspective view of a multi-layer radome with an illuminated symbol according to one aspect.

FIG. 3 depicts an exploded perspective view of a multi-layer radome with an illuminated symbol 200 according to one aspect. The multi-layer radome 200 can alternately be referred to as an antenna shield. As depicted, the multi-layer radome 200 includes an overmolded applique 210, a light assembly 240, a waveguide 220, a housing 230, a trim bezel 270, a gasket or seal 280, a mating connector 290, and a vent 252. In another aspect, the multi-layer radome 200 can include only the overmolded applique 210, the light assembly 240, and the waveguide 220. In one aspect, the multi-layer radome 200 can be mounted at a 15° angle relative to a plane parallel to the radar source 260. In one aspect, the multi-layer radome 200 can be mounted between a 0° and 30° angle relative to a plane parallel to the radar source 260. The attenuation is impacted by the mounting angle and the multi-layer radome 200 can extend the allowable range of mounting angles when compared to the prior art. Put another way, the multi-layer radome 200 can have a wider range of mounting angles that achieve acceptable attenuation. A mounting angle between 0° and 30° can allow the same multi-layer radome 200 to be used for multiple vehicle types. For example, a sports car can have a mounting angle of 30° while a sport utility vehicle ("SUV") can have a mounting angle of 0°.

The multi-layer radome 200 is a two-layer construction, meaning there are only two layers 210, 220 between the radar source 260 (shown in FIG. 4) and the outside air. These two layers are the waveguide 220 and the overmolded applique 210. The two-layer multi-layer radome 200 has improved radar transparency performance compared to the prior art three-layer multi-layer radome 300 because there are fewer layers affecting the radar transparency. The multi-layer radome 200 has high radar transparency while also being cost-effective, in part because of the reduced number of radar transparent layers.

The waveguide 220 is located between the light assembly 240 and the overmolded applique 210. The waveguide 220 can alternately be referred to as a light pipe. The overmolded applique 210 can alternately be referred to as an A-surface layer. As depicted, the overmolded applique 210 includes a radar transparent film and an overmolded polycarbonate ("PC"). In one aspect, the overmolded applique 210 can be made from Poly(methyl methacrylate) ("PMMA") or any other transparent polymer. In one aspect, the radar transparent film can be printed and vacuum formed. In one aspect, the radar transparent film can be printed, laser etched, or injection overmolded. The overmolded transparent polymer can include an ultraviolet ("UV") hard coat. In another aspect, the overmolded applique 210 can be a single component construction. In another aspect, the overmolded applique 210 can include three or more components.

The overmolded applique 210 can directly overlap the waveguide 220. The waveguide 220 can be configured to transmit light from the light assembly 240 to the overmolded applique 210. In one aspect, the waveguide 220 can transmit light from the light assembly 240 to the overmolded applique 210 in a desired pattern. The light from the light assembly 240 can light up the overmolded applique 210 resulting in an illuminated symbol. The overmolded applique 210 can include a symbol. Portions of the symbol that are not intended to be illuminated can have a low light transmissivity so that only the intended portions appear illuminated. The overmolded applique 210 can have Lambertian radiation such that the symbol appears uniformly illuminated. In one aspect, the multi-layer radome 200 can have a luminance greater than 2,500 Candelas per meter squared ($cd/m^2$). In one aspect, the overmolded applique 210 can change the color emitted from the multi-layer radome 200 when compared to the color emitted by the light assembly 240.

As depicted, the gasket 280 is located between the waveguide 220 and the light assembly 240. The gasket 280 can seal the connection between the waveguide 220 and the light assembly 240. In one aspect, the gasket 280 can create a fixed air gap between the waveguide 220 and the light assembly 240. In an alternate aspect, the waveguide 220 can be directly coupled to the light assembly 240. In another aspect, there can be an air gap between the waveguide 220 and the light assembly 240. In one aspect, the gasket 280 can be made from a sulfur-free material.

Figure 4:
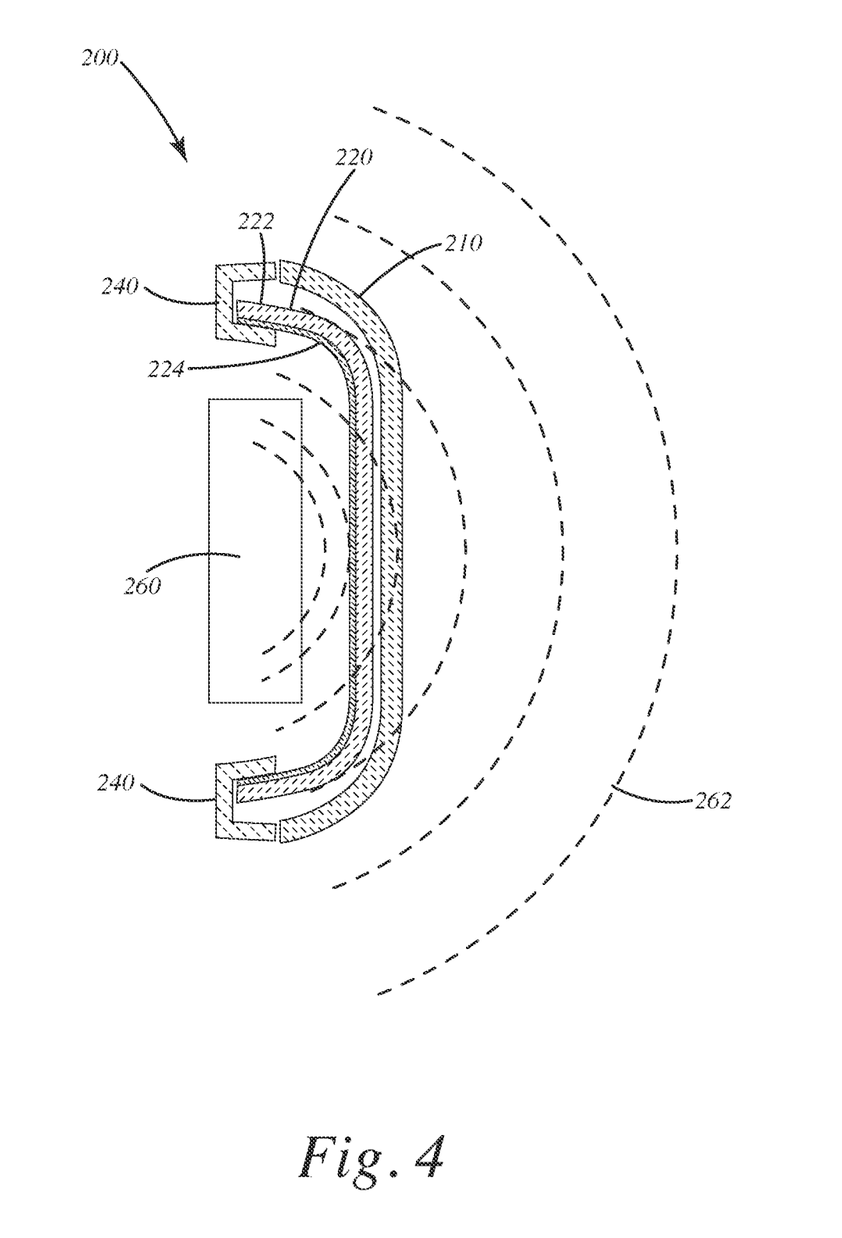
FIG. 4 is a representational view of an overmolded applique, waveguide, and light assembly of the multi-layer radome with an illuminated symbol of FIG. 3.

The waveguide 220 can include multiple components, as shown in FIG. 4. The waveguide 220 can include a waveguide layer 222 and a light blocking backer 224 coupled to the waveguide layer 222. The light blocking backer 224 enables the multi-layer radome 200 to be a two-layer solution rather than a three-layer solution. Put another way, the light blocking backer 224 can be so thin it is not a noticeable attenuator to millimeter wave radiation (it is not a layer) whereas the housing 130 of the prior art radome 100 is thick enough that it is tuned and optimized to achieve a minimum attenuation (it is a layer), which is still a greater attenuation than that of the light blocking backer 224. The light blocking backer 224 is part of the waveguide 220 rather than being its own distinct layer. In one aspect, the light blocking backer 224 is a white film. The thickness of the light blocking backer 224 is set to be small compared to the waveguide layer 222. In one aspect, the light blocking backer 224 can be at least ten times thinner than the waveguide layer 222. In one aspect, the waveguide layer 222 is 2.25 millimeters thick and the light blocking backer 224 is 0.125 millimeters thick. The waveguide 220 can be directly exposed to an interior 202 of the multi-layer radome 200. In one aspect, the waveguide 220 can be made from a molded PC material and include a hot stamped white pattern. In one aspect, the waveguide layer 222 can be made from PMMA.

As depicted in FIG. 3, the light assembly 240 is ring-shaped, which allows the light assembly 240 to not interfere with the radar waves sent from the radar source 260. Put another way, a ring-shaped light assembly 240 prevents the light assembly from becoming an additional layer in the multi-layer radome 200. In one aspect, the light assembly 240 may be a device constructed in accordance with U.S. Pat. No. 7,909,482 issued Mar. 22, 2011, entitled "Electrical Device Having Boardless Electrical Component Mounting Arrangement". In one aspect, the light assembly 240 can include a plurality of LEDs. In one aspect, each LED can emit a minimum of 31 Lumens. In one aspect, the illumination of the left side of the overmolded applique 210 can be controlled using the left headlight and the illumination of the right side of the overmolded applique 210 can be controlled using the right headlight. The vent 252 can be coupled to the light assembly 240. The vent 252 is configured to remove thermal energy from the multi-layer radome 200. In one aspect, the vent 252 is a vent patch.

As shown representationally in FIG. 4, the multi-layer radome 200 is coupled to the radar source 260. In one aspect, the multi-layer radome 200 can be coupled directly to the radar source 260. In another aspect, the multi-layer radome 200 can be coupled to another component that is coupled to the radar source 260. For example, the multi-layer radome 200 can be coupled to a vehicle grille cover. In one aspect, the light assembly 240 can be coupled to the radar source 260. As depicted in FIG. 3, the light assembly 240 can couple to the radar source 260 through the mating connector 290. The mating connector 290 can be configured to secure the multi-layer radome 200 to the radar source 260. In another aspect, the light assembly 240 can couple to the radar source 260 through any other suitable means. In another aspect, a different component of the multi-layer radome 200, for example a housing, can be coupled to the radar source 260.

As depicted in FIG. 4, radar waves 262 either emitted from or returning to the radar source 260 travel through the waveguide 220 and the overmolded applique 210. The useful radar waves 262 do not travel through the light assembly 240.

The trim bezel 270 can be configured to couple the overmolded applique 210, the light assembly 240, and the waveguide 220 together. In one aspect, the trim bezel 270 fixedly couples the overmolded applique 210, the light assembly 240, and the waveguide 220 together. As depicted, the trim bezel 270 couples to the light assembly 240. In another aspect, the trim bezel 270 can couple to any other component of the multi-layer radome 200, for example a housing. As depicted, the trim bezel 270 is ring-shaped to avoid interference with the radar source 260. Additionally, the ring-shaped trim bezel 270 can minimize the interference with the overmolded applique 210 and any symbol included thereon. In one aspect, the trim bezel 270 can be made from PMMA.

Figure 7:
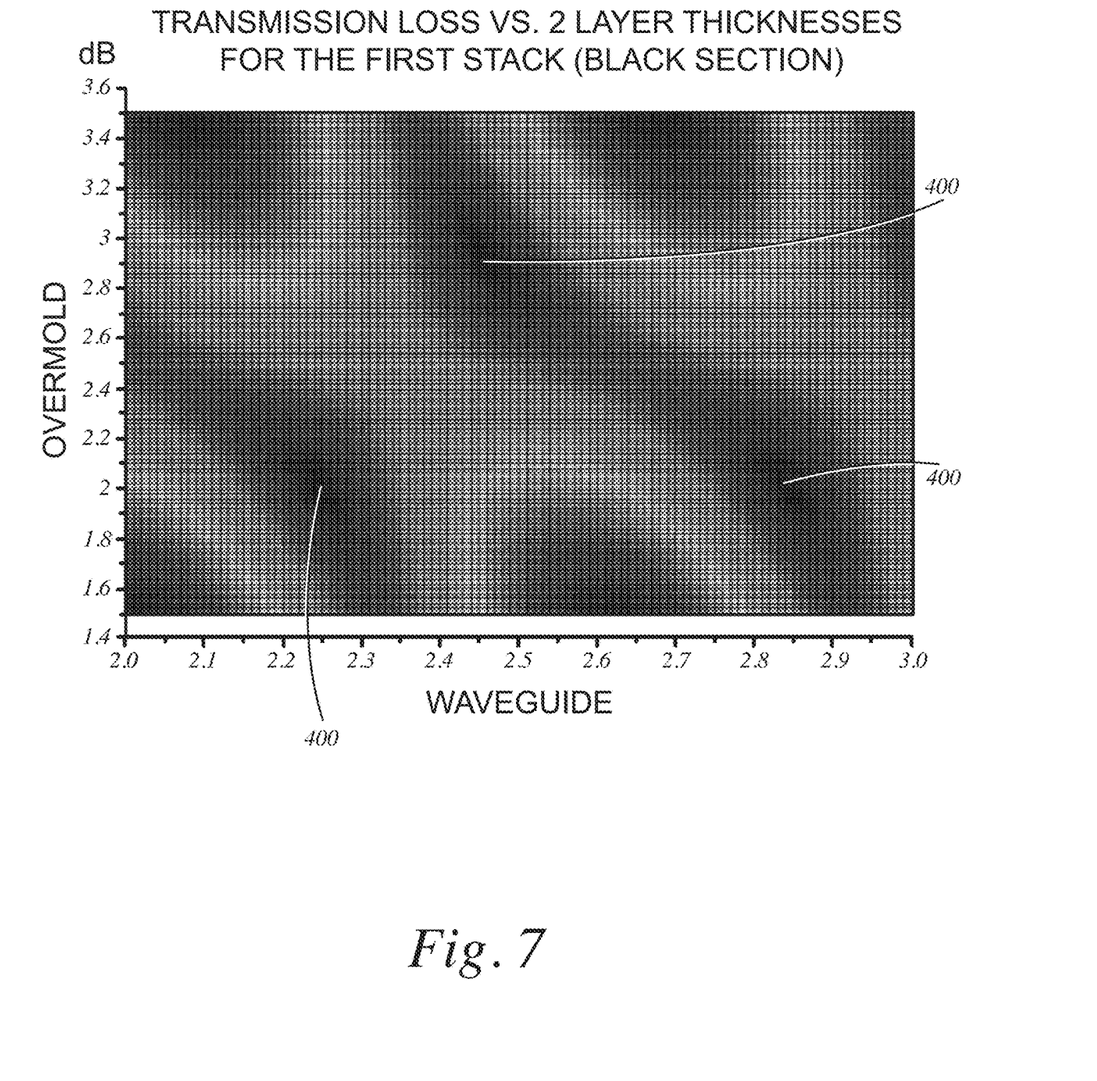
FIG. 7 is a graph of the thickness of an overmolded applique versus the thickness of a waveguide.

The overall transparency of the two-layer radome 200 is determined by the combination of the layer thicknesses and the permittivity of each material. It is important to consider the interaction of the two layers in the multi-layer radome 200 rather than determining the transparency of each layer as an individual layer. As shown in FIG. 7, the areas of maximum transparency 400 are found at specific combinations of each layer's thickness. FIG. 7 shows the thickness of the waveguide 220 along the x-axis and the thickness of the overmolded applique 210 along the y-axis. In one aspect, the multi-layer radome 200 can weigh less than 360 grams.

Figure 6:
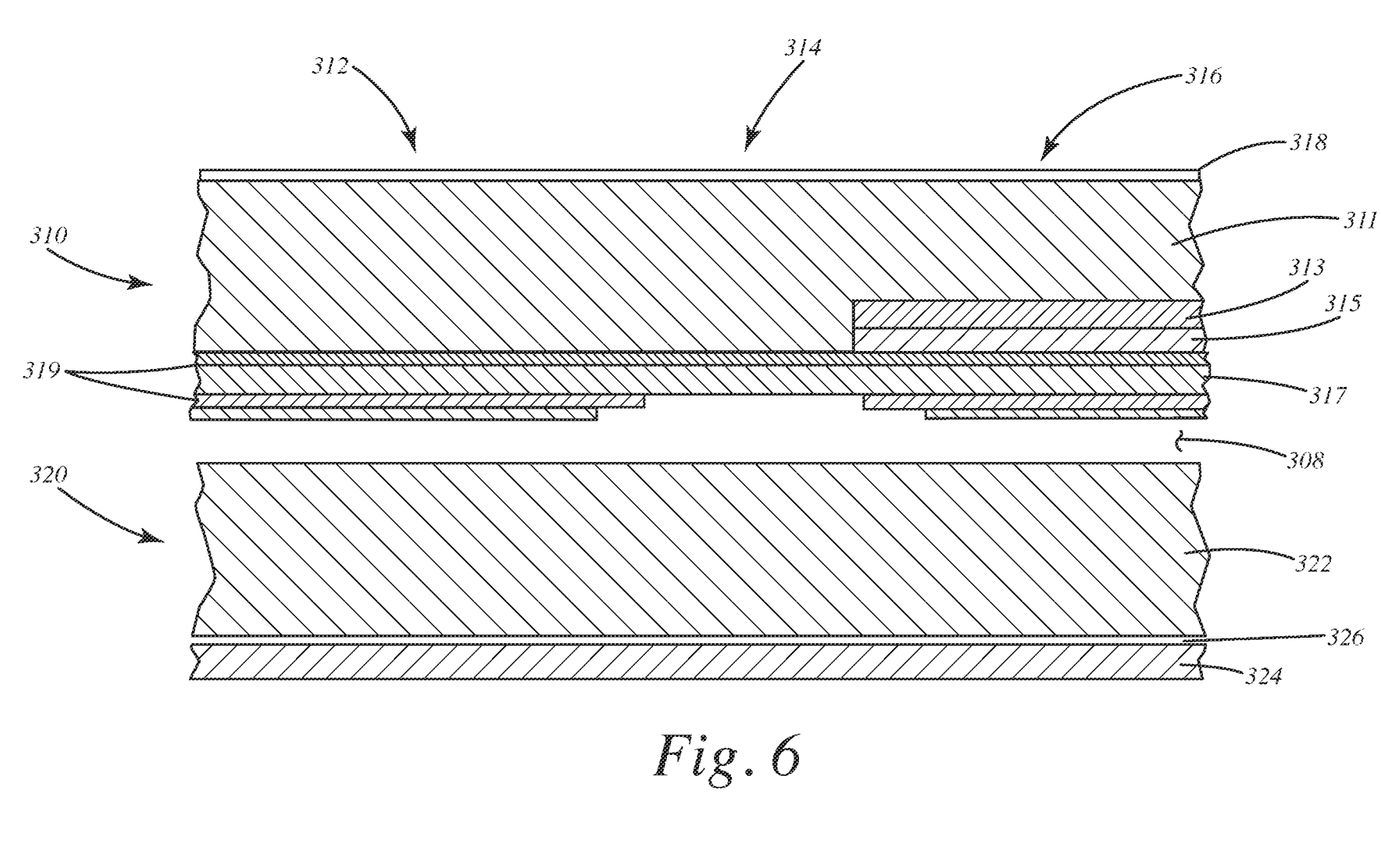
FIG. 6 is a detailed view of an overmolded applique and a waveguide of a multi-layer radome with an illuminated symbol according to one aspect.

FIG. 6 shows a detailed view of an overmolded applique 310 and a waveguide 320 of a multi-layer radome with an illuminated symbol according to one aspect. In one aspect, the overmolded applique 310 is 2.375 millimeters thick and the waveguide 320 is 2.425 millimeters thick. In one aspect, the overmolded applique 310 and the waveguide 320 can be made from a material with a low absorption loss.

The waveguide 320 can include a waveguide layer 322 and a light blocking backer 324. In one aspect, a waveguide 320 thickness between 2 millimeters and 2.5 millimeters is preferred because it is thick enough to couple with most white LEDs. This range of thickness is also thin enough such that the waveguide 320 can be formed with a reasonably small radius without losing its waveguide properties. In one aspect, the waveguide layer 322 can be made from a PC material. In one aspect the waveguide layer 322 is 2.25 millimeters thick. In one aspect, the light blocking backer 324 can be made from a white PC film. In one aspect, light blocking backer 324 is 0.125 millimeters thick. The waveguide layer 322 and the light blocking backer 324 can be joined by an interface 326. In one aspect, the interface 326 is 0.05 millimeters thick.

As depicted, the overmolded applique 310 includes a black section 312, an illuminated section 314, and a "chrome" section 316. In one aspect, the overmolded applique 310 can include at least one of a black section 312, an illuminated section 314, and a chrome section 316. The black section 312 can include an outer surface 318, an overmold 311, and a base film 317 with ink 319 on the top surface and the bottom surface. The illuminated section 314 can include the outer surface 318, the overmold 311, and the base film 317 with ink 319 only on the top surface. The chrome section 316 can include the outer surface 318, the overmold 311, a protective layer 313, a chrome film 315, and the base film 317 with ink 319 on the top surface and the bottom surface.

The overmolded applique 310 can include the outer surface 318. In one aspect, the outer surface 318 can be a UV hard coat. In one aspect, the outer surface 318 is 0.005 millimeters thick. The outer surface 318 can be coupled with the overmold 311. In one aspect, the overmold 311 can be made from a PC material. In one aspect, the overmold 311 is 1.98 millimeters thick. The overmold 311 can be coupled with the protective layer 313. In one aspect, the protective layer 313 can be made from a PC material. In one aspect, the protective layer 313 is 0.125 millimeters thick. The protective layer 313 can be coupled with the chrome film 315. In one aspect, the chrome film 315 can be made from a polyethylene terephthalate ("PET") material. In one aspect, the chrome film 315 is 0.125 millimeters thick. The chrome film 315 can be coupled with the base film 317. The base film 317 can have ink 319 on the top surface, the bottom surface, both the top and bottom surfaces, or neither surface. In one aspect, the base film 317 can be made from a PC material. In one aspect, the base film 317 is 0.14 millimeters thick.

As depicted, there is an air gap 308 between the overmolded applique 310 and the waveguide 310. In one aspect, the air gap is 0.25 millimeters thick.

The multi-layer radomes described herein can be used anywhere that a radome would benefit from being illuminated. For example, the multi-layer radome can be used anywhere radar transceivers are located on a vehicle (e.g. other than the front grille); non-automotive vehicles such as heavy truck, power sports, and agricultural vehicles; and other markets that utilize radar transceivers.

Terms like "preferably," "commonly," and "typically," when utilized herein, are not utilized to limit the scope of the invention or to imply that certain features are critical, essential, or even important to the structure or function of the invention. Rather, these terms are merely intended to identify particular aspects of an aspect of the present disclosure or to emphasize alternative or additional features that may or may not be utilized in a particular aspect of the present disclosure.

For the purposes of describing and defining the present invention it is noted that the terms "substantially," "about," and "approximately" are utilized herein to represent the inherent degree of uncertainty that may be attributed to any quantitative comparison, value, measurement, or other representation. The terms "substantially," "about," and "approximately" are also utilized herein to represent the degree by which a quantitative representation may vary from a stated reference without resulting in a change in the basic function of the subject matter at issue.

Features of various aspects may be used in combination with features from other aspects. Directional terms, such as "vertical," "horizontal," "top," "bottom," "front," "rear," "upper," "lower," "inner," "inwardly," "outer," "outwardly," "forward," and "rearward" are used to assist in describing the invention based on the orientation of the aspects shown in the illustrations. The use of directional terms should not be interpreted to limit the invention to any specific orientation(s). Any reference to claim elements in the singular, for example, using the articles "a," "an," "the," or "said," is not to be construed as limiting the element to the singular.

Having described the subject matter of the present disclosure in detail and by reference to specific aspects thereof, it is noted that the various details disclosed herein should not be taken to imply that these details relate to elements that are essential components of the various aspects described herein, even in cases where a particular element is illustrated in each of the drawings that accompany the present description. Further, it will be apparent that modifications and variations are possible without departing from the scope of the invention. More specifically, although some aspects of the present disclosure are identified herein as preferred or particularly advantageous, it is contemplated that the present disclosure is not necessarily limited to these aspects.

The invention claimed is:

1. A multi-layer radome consisting of:
   an overmolded applique;
   a light assembly; and
   a waveguide between the light assembly and the overmolded applique, wherein the waveguide is configured to transmit light from the light assembly to the overmolded applique.

2. The multi-layer radome of claim 1, wherein the light assembly is ring-shaped.

3. The multi-layer radome of claim 2, wherein the light assembly is coupled to a radar source.

4. The multi-layer radome of claim 1, wherein the overmolded applique and the waveguide are made from a material with a low absorption loss.

5. The multi-layer radome of claim 1, the waveguide including:
   a waveguide layer; and
   a light blocking backer coupled to the waveguide layer, wherein the light blocking backer is at least ten times thinner than the waveguide layer.

6. The multi-layer radome of claim 5, wherein the waveguide layer is 2.25 millimeters thick, and the light blocking backer is 0.125 millimeters thick.

7. The multi-layer radome of claim 1, wherein the overmolded applique is 2.375 millimeters thick and the waveguide is 2.425 millimeters thick.

8. The multi-layer radome of claim 1, wherein the overmolded applique includes at least one of an illuminated section, a black section, and a chrome section.

9. The multi-layer radome of claim 1, further consisting of:
   an air gap between the overmolded applique and the waveguide.

10. The multi-layer radome of claim 9, wherein the air gap is 0.25 millimeters thick.

11. The multi-layer radome of claim 1, further consisting of:
   a trim bezel configured to couple the overmolded applique, the light assembly, and the waveguide together.

12. A multi-layer radome consisting of:
   an overmolded applique;
   a light assembly;
   a waveguide between the light assembly and the overmolded applique, wherein the waveguide is configured to transmit light from the light assembly to the overmolded applique;
   a gasket between the waveguide and the light assembly, the gasket configured to seal the connection between the waveguide and the light assembly;
   a trim bezel, the trim bezel configured to fixedly couple the overmolded applique, the waveguide, and the light assembly together;
   a vent coupled to the light assembly, the vent configured to remove thermal energy from the multi-layer radome; and
   a mating connector, the mating connector configured to secure the multi-layer radome to a radar source.

13. The multi-layer radome of claim 12, the waveguide consisting of including:
   a waveguide layer; and a light blocking backer coupled to the waveguide layer, wherein the light blocking backer is at least ten times thinner than the waveguide layer.

14. The multi-layer radome of claim 13, wherein the waveguide layer is 2.25 millimeters thick, and the light blocking backer is 0.125 millimeters thick.

15. The multi-layer radome of claim 14, wherein the overmolded applique includes at least one of an illuminated section, a black section, and a chrome section.

16. A multi-layer radome comprising:
an overmolded applique;
a light assembly; and
a waveguide between the light assembly and the overmolded applique, the waveguide directly exposed to an interior of the multi-layer radome, the waveguide including a waveguide layer and a light blocking backer coupled to the waveguide layer, wherein the light blocking backer is at least ten times thinner than the waveguide layer,
wherein the overmolded applique directly overlaps the waveguide, and
wherein the waveguide is configured to transmit light from the light assembly to the overmolded applique.

17. The multi-layer radome of claim 16, wherein the waveguide layer is 2.25 millimeters thick, and the light blocking backer is 0.125 millimeters thick.

18. A multi-layer radome of claim 16, further comprising:
an overmolded applique;
a light assembly;
a waveguide between the light assembly and the overmolded applique, the waveguide directly exposed to an interior of the multi-layer radome, and
an air gap between the overmolded applique and the waveguide,
wherein the overmolded applique directly overlaps the waveguide, and
wherein the waveguide is configured to transmit light from the light assembly to the overmolded applique.

* * * * *

UNITED STATES PATENT AND TRADEMARK OFFICE
CERTIFICATE OF CORRECTION

| | | |
|---|---|---|
| PATENT NO. | : 12,255,385 B2 | Page 1 of 1 |
| APPLICATION NO. | : 18/070008 | |
| DATED | : March 18, 2025 | |
| INVENTOR(S) | : Thomas J. Veenstra et al. | |

It is certified that error appears in the above-identified patent and that said Letters Patent is hereby corrected as shown below:

In the Claims

In Column 8, Claim 13, Line 66:
"consisting of including:" should be --including:--

In Column 10, Claim 18, Line 8:
"A multi-layer radome of claim 16, further comprising:" should be --A multi-layer radome comprising:--

Signed and Sealed this
Fifteenth Day of April, 2025

Coke Morgan Stewart
*Acting Director of the United States Patent and Trademark Office*